(12) United States Patent
Nord et al.

(10) Patent No.: US 9,850,799 B2
(45) Date of Patent: Dec. 26, 2017

(54) METHOD OF AND APPARATUS FOR EXHAUSTING INTERNAL COMBUSTION ENGINES

(71) Applicant: Shirley June Shirra, Woombye (AU)

(72) Inventors: Dustin Nord, Sarasota, FL (US); Cynthia O'Donnell, Sarasota, FL (US); Thomas Shirra, Mooloolah (AU)

(73) Assignee: NG1 Technologies, Inc., Sarasota, FL (US)

( * ) Notice: Subject to any disclaimer, the term of this patent is extended or adjusted under 35 U.S.C. 154(b) by 168 days.

(21) Appl. No.: 14/745,024

(22) Filed: Jun. 19, 2015

(65) Prior Publication Data

US 2015/0377101 A1    Dec. 31, 2015

Related U.S. Application Data

(63) Continuation-in-part of application No. 13/539,493, filed on Jul. 1, 2012, now Pat. No. 9,103,263, which is a continuation-in-part of application No. 11/988,419, filed as application No. PCT/AU2006/000965 on Jul. 7, 2006, now Pat. No. 8,234,859.

(30) Foreign Application Priority Data

Jul. 8, 2005   (AU) ................. 2005903631

(51) Int. Cl.
| | | |
|---|---|---|
| *F02B 27/02* | (2006.01) | |
| *F01N 1/00* | (2006.01) | |
| *F01N 13/10* | (2010.01) | |
| *F01N 1/08* | (2006.01) | |
| *F01N 13/08* | (2010.01) | |
| *F01N 1/10* | (2006.01) | |
| *F02B 27/04* | (2006.01) | |

(52) U.S. Cl.
CPC ............. *F01N 13/10* (2013.01); *F01N 1/088* (2013.01); *F01N 1/10* (2013.01); *F01N 13/082* (2013.01); *F02B 27/04* (2013.01); *F01N 2470/02* (2013.01); *F01N 2490/08* (2013.01); *Y02T 10/146* (2013.01)

(58) Field of Classification Search
CPC ........ F01N 13/082; F01N 13/10; F01N 1/088; F01N 1/10; F01N 2470/02; F01N 2490/08; F02B 27/04; Y02T 10/146
USPC ...................................... 60/312, 324
See application file for complete search history.

(56) References Cited

U.S. PATENT DOCUMENTS 5,152,366 A * 10/1992 Reitz .................. F01N 1/00
                                                              181/249

* cited by examiner

*Primary Examiner* — Phutthiwat Wongwian
*Assistant Examiner* — Diem Tran
(74) *Attorney, Agent, or Firm* — Arendt & Associates Intellectual Property Group; Jacqueline M. Arendt

(57) ABSTRACT

Disclosed herein is a method and an insert device for an internal combustion engine including: a central exhaust passage; a first expansion chamber in an upstream portion of the exhaust system and in fluidic communication with the central exhaust passage; a second expansion chamber in a downstream portion of the exhaust system and in fluidic communication with the central exhaust passage and the first expansion chamber, forming a continuous expansion chamber throughout a length of the insert device.

18 Claims, 7 Drawing Sheets

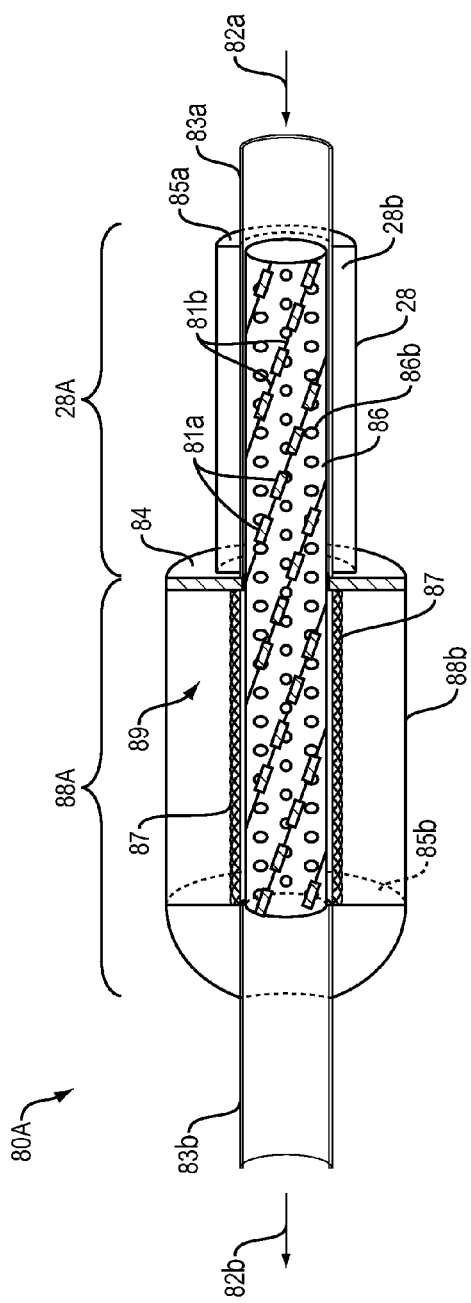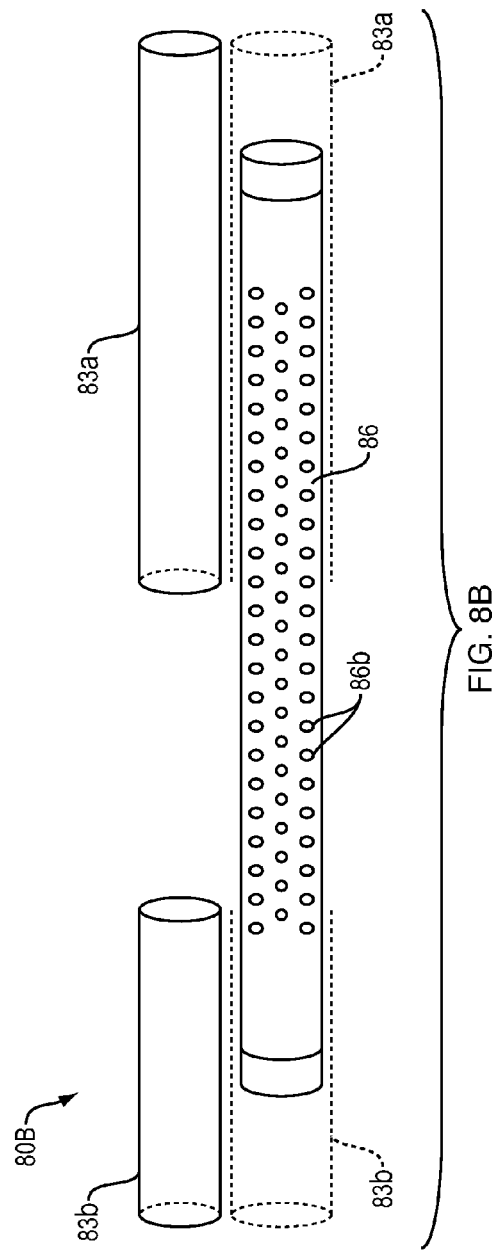
FIG. 8A
FIG. 8B

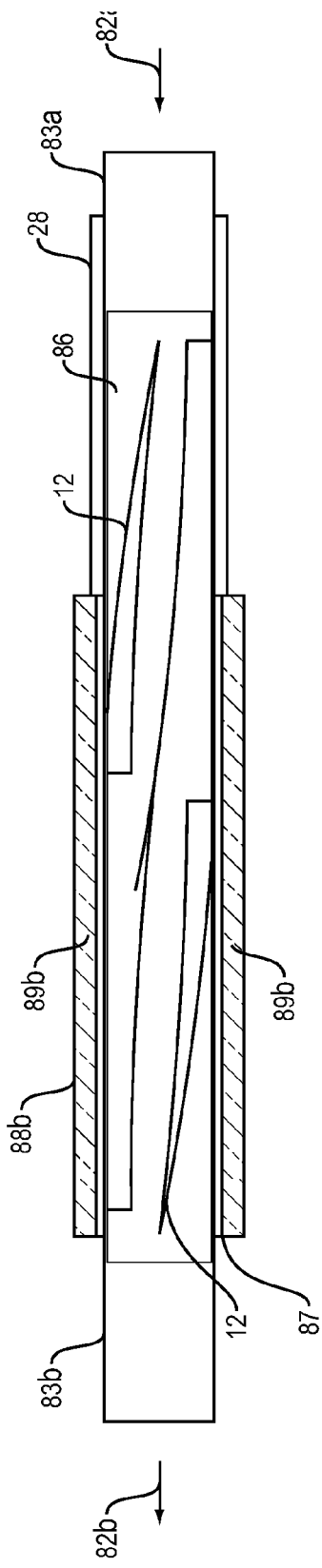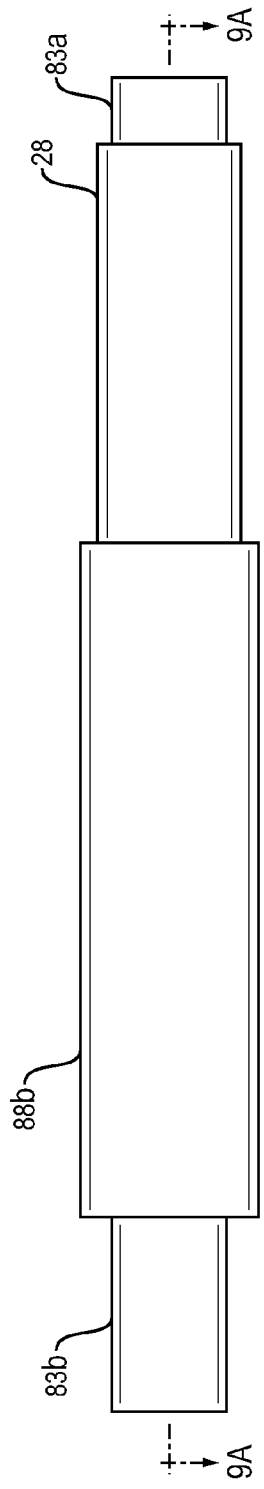
FIG. 9A
FIG. 9B

METHOD OF AND APPARATUS FOR EXHAUSTING INTERNAL COMBUSTION ENGINES

CROSS REFERENCE TO RELATED APPLICATIONS

Related Applications

This application is a U.S. Continuation in Part of co-pending U.S. Ser. No. 13/539,493 filed on 1 Jul. 2012, which is a U.S. Continuation in Part of co-pending U.S. Ser. No. 11/988,419 filed on 7 Jan. 2008, which is the U. S. National Stage of International Application No. PCT/AU2006/000965, which designated the United States and was filed on 7 Jul. 2006, published in English, which claims the benefit of Australian Provisional Patent Application No. 2005903631, filed on 8 Jul. 2005. The entire teachings of the above applications are incorporated herein by reference.

FIELD OF INVENTION

THIS INVENTION relates to a method of and apparatus for exhausting internal combustion engines. The invention has application to all kinds of internal combustion engines including two-stroke, four-stroke and diesel engines, reciprocating and rotary engines.

BACKGROUND

Exhausting of internal combustions engines involves the provision of an exhaust system including an exhaust manifold into which the combustion products are directed from the combustion chamber or chambers of the engine and a pipe leading from the manifold to a silencer of muffler. A tail pipe is usually provided from the muffler, and it is also common to include a catalytic converter in the exhaust gas flow path, usually before the silencer.

The exhaust system nearly always produces a back-pressure when the engine is operating. It has been suggested by some that the back-pressure so generated is beneficial for efficient operation of internal combustion engines. More usually, a maximum back pressure is specified, but no minimum. It is believed by the inventor that the efficient removal of exhaust gases from the engine would provide better performance for internal combustion engines because less energy would be directed to pushing the exhaust gases through the exhaust system.

Exhaust systems have been proposed which include a spiral or helical path for part of the passage between the exhaust manifold and the end of the tail pipe. However, in such arrangements, the spiral flow path is a usually constrained one, or alternatively, only a small butterfly-type baffle is provided. As a result, the angular momentum imparted to the exhaust gases has been limited.

The present invention aims to provide a method of and apparatus for exhausting internal combustion engines which alleviates one or more of the inefficiencies or disadvantages of the prior art. Other aims and advantages of the invention may become apparent from the following description.

SUMMARY OF THE INVENTION

With the foregoing in view, this invention resides broadly in a method of exhausting internal combustion engines including: receiving a flow of exhaust gases from an internal combustion engine into an exhaust passage; generating a vortex in the flow of exhaust gases; expelling the exhaust gases from the exhaust passage such that the gases so expelled include a torsional component.

In another aspect, the present invention resides broadly in a method of exhausting internal combustion engines including: receiving a flow of exhaust gases from an internal combustion engine into an exhaust passage; generating a vortex in a flow of gas or gases in operative association with the flow of exhaust gases whereby a torsional component of flow is imparted to the flow of exhaust gases; and expelling the exhaust gases from the exhaust passage.

In another aspect, the present invention resides broadly in exhausting apparatus for exhausting an internal combustion engine including: an exhaust passage for flow of exhaust gases from the engine along an axis of the passage; one or more vanes in operative association with the exhaust passage, said vanes being disposed in angular relationship to the axis of the passage.

The exhausting apparatus of the invention, in use, imparts a torsional component in the flow of exhaust gases. Preferably, the torsional component is imparted between the exhaust manifold and the muffler or silencer. More preferably, the torsional component is imparted downstream from any exhaust system component which would dissipate the torsional component whereby, in use, exhausted gases emerging from the orifice of the tail pipe include a vortex or torsional component. The torsional component may be imparted directly to the exhaust gases as they pass through the apparatus of the invention, or a torsional component may be imparted by inducting outside gases into the flowpath of the exhaust gases, and in so inducting, imparting a torsional component to the flow such that, by mixing with the exhaust gases, a torsional component is imparted to the mixed gas flow.

In a preferred form, a plurality of vanes is provided a length of pipe forming part of the exhaust system of an engine. The vanes are arranged at an angle to the axis of the pipe. Preferably, the vanes extend inward from the inner face of the pipe and are of substantially constant width. In one example of the invention, a length of pipe may be slit along part of its length, the slit being spiral or helical in form, and being able to be opened by twisting the pipe in the opposite direction to the direction of the spiral of the slit. A vane may be twisted in the same direction of the slit and inserted therein when opened. If the pipe is formed from a material having normal elasticity, and the vane is inserted such that its outer edge is aligned with the outer face of the pipe, when the twist in the pipe is relieved, the vane will be clamped by each side of the slit, and may be fixed in place. Since such pipes are typically constructed from metal, it may be appropriate for the fixing to be achieved by welding the vane in place. Moreover, a plurality of vanes may be added to the pipe in such manner, the vanes being of a height and number to generate a vortex in use, but not to restrict the flow of gases by being an obstruction. Indeed, it is preferred that the vortex generated in use be such that a negative pressure is imparted to the exhaust manifold.

Disclosed herein is an exhausting apparatus for exhausting an internal combustion engine including: a central exhaust passage for flow of exhaust gases from the engine along an axis of the passage; a first expansion chamber in an upstream portion of the exhaust system, the first expansion chamber disposed substantially at the central exhaust passage and in fluidic communication with the central exhaust passage, the first expansion chamber permitting a flow of a portion of the exhaust gases or a release of pressure from the central exhaust passage into said first expansion chamber; a second expansion chamber in a downstream portion of the exhaust system, the second expansion chamber disposed substantially at the central exhaust passage and in fluidic communication with the central exhaust passage and the first expansion chamber, the fluidic communication between the first and the second expansion chambers thereby forming a continuous expansion chamber throughout a length of the exhausting apparatus and permitting a flow of exhaust gases or a release of pressure from the central exhaust passage to the first expansion chamber and the second expansion chamber.

One embodiment of the invention is an insert device for retrofitting into an existing exhaust system pipe of an internal combustion engine, the insert device comprising: a perforated pipe axially positioned within a solid pipe having a first end and a second end, the first and the second ends capable being expanded or attached to a connector in order to meet the diameter of the existing exhaust system pipe to secure the perforated pipe in place such that the perforated pipe is positioned as a new exhaust passage for directing flow of exhaust gases from the engine along an axis of the new exhaust passage;
one or more vanes extending substantially the length of the perforated pipe and formed into a spiral, turning around the circumference of the perforated pipe, and with a first edge mounted to an internal face of the perforated pipe and the solid pipe, and a second edge spaced inwardly from and substantially coaxial with the internal face, said one or more vanes being of substantially constant width and being disposed in angular relationship to the axis of the perforated pipe, and configured to impart a torsional component to at least a portion of said exhaust gases while passing through said perforated pipe, with the proviso that a configuration of vanes does not restrict or obstruct the flow of said exhaust gases.

Yet another embodiment of the invention is an exhausting apparatus for exhausting an internal combustion engine including: an exhaust passage for directing flow of exhaust gases from the engine along an axis of the passage; one or more vanes extending substantially the length of the exhaust passage and formed into a spiral, turning around the circumference of the exhaust passage, and with a first edge mounted to an internal face of the exhaust passage, and a second edge spaced inwardly from and substantially coaxial with the internal face, said one or more vanes being of substantially constant width and being disposed in angular relationship to the axis of the exhaust passage, and configured to impart a torsional component to at least a portion of said exhaust gases while passing through said exhaust passage, with the proviso that a configuration of vanes does not restrict or obstruct the flow of said exhaust gases; a first expansion chamber in an upstream portion of the exhaust system, the first expansion chamber disposed substantially at the central exhaust passage and in fluidic communication with the central exhaust passage, the first expansion chamber permitting a flow of a portion of the exhaust gases or a release of pressure from the central exhaust passage into said first expansion chamber; a second expansion chamber in a downstream portion of the exhaust system, the second expansion chamber disposed substantially at the central exhaust passage and in fluidic communication with the central exhaust passage and the first expansion chamber, the fluidic communication between the first and the second expansion chambers thereby forming a continuous expansion chamber throughout a length of the exhausting apparatus and permitting a flow of exhaust gases or a release of pressure from the central exhaust passage to the first expansion chamber and the second expansion chamber.

Also disclosed herein is a method of exhausting an internal combustion engine comprising: receiving a flow of exhaust gases from an internal combustion engine into an exhaust passage; permitting a flow of a first portion of the exhaust gases or a release of pressure from the exhaust passage into a first expansion chamber, the first expansion chamber disposed substantially at the exhaust passage in fluidic communication with the exhaust passage; permitting a flow of a second portion of exhaust gases or a release of pressure from said first expansion chamber to a second expansion chamber, the second expansion chamber disposed substantially at the exhaust passage in fluidic communication with the first expansion chamber to form a continuous expansion chamber, and in fluidic communication with the exhaust passage chamber; generating a vortex in the flow of exhaust gases; and
expelling the exhaust gases from said exhaust passage such that at least a portion of the gases so expelled include a torsional component.

Disclosed herein in an embodiment is an insert device for retrofitting into an exhaust system pipe of an internal combustion engine, where the insert device includes an inner pipe having a first end and a second end, the first and the second ends sized with an outer diameter to be fit within the inner diameter of the exhaust system pipe to secure the first and second ends respectively. The inner pipe is positioned as a new exhaust passage for directing flow of exhaust gases from the engine along an axis of the new exhaust passage, where the inner pipe, along at least a portion of its length between the first and second ends, exhibits an outer diameter less than the inner diameter of the existing exhaust system pipe. As a result, an annular expansion chamber is formed between the inner pipe and the exhaust system pipe. The insert device also includes one or more vanes extending over at least a portion of the length of the inner pipe and formed into a spiral, turning around the circumference of the inner pipe. The vanes include a first edge mounted to an internal face of the inner pipe, and a second edge spaced inwardly from and substantially coaxial with the internal face. The vanes being of substantially constant width and being disposed in angular relationship to the axis of the exhaust passage, and configured to impart a torsional component to at least a portion of said exhaust gases while passing through said inner pipe, with the proviso that a configuration of vanes does not restrict or obstruct the flow of the exhaust gases.

In addition, in an embodiment, the expansion chamber is disposed substantially at the exhaust passage and in fluidic communication with the exhaust passage, the expansion chamber permitting a flow of a portion of the exhaust gases or a release of pressure from the central exhaust passage into said expansion chamber. The inner pipe may include perforations therein, the perforations permit fluidic communication between said exhaust passage and said expansion chamber.

In an embodiment, at least one of the first and second ends of the inner pipe are secured at least partially along their respective circumferences permitting the flow of gases from the expansion chamber. In another embodiment, the expansion chamber is disposed substantially concentric with the exhaust passage. In yet another embodiment, other vanes are provided as a plurality of vanes along a length of pipe forming part of an exhaust system of the internal combustion engine, the vanes being arranged at an angle to the axis of the pipe.

In a further embodiment the circular, torsional component of the portion of said exhaust gases imparts a negative pressure to the engine. In yet a further embodiment, the imparted torsional component to at least a portion of said exhaust gases forms a vortex in the exhaust passage. Moreover, the exhaust system pipe may be an existing exhaust system pipe wherein the insert device is disposed within the existing exhaust system pipe. In a further embodiment the one or more vanes are located so as to impart a torsional component to at least a portion of said exhaust gases passing through the exhaust passage between an exhaust manifold and a muffler. In addition, one or more of the vanes are located to impart a torsional component to at least a portion of the exhaust gases passing through the exhaust passage downstream from any exhaust system component that can dissipate the torsional component.

Also disclosed herein is another insert device for retrofitting into an existing exhaust system pipe of an internal combustion engine. The insert device includes a solid and perforated pipe having a first end and a second end, the first and the second ends capable being expanded or attached to a connector in order to meet the diameter of the existing exhaust system pipe to secure the solid and perforated pipe in place such that the perforated pipe is positioned as a new exhaust passage for directing flow of exhaust gases from the engine along an axis of the new exhaust passage. In addition one or more vanes extending substantially the length of the perforated pipe and formed into a spiral, turning around the circumference of the perforated pipe, and with a first edge mounted to an internal face of the perforated pipe, and a second edge spaced inwardly from and substantially coaxial with the internal face, said one or more vanes being of substantially constant width and being disposed in angular relationship to the axis of the perforated pipe, and configured to impart a torsional component to at least a portion of said exhaust gases while passing through said perforated pipe, with the proviso that a configuration of vanes does not restrict or obstruct the flow of said exhaust gases.

In an embodiment, the, torsional component of the portion of said exhaust gases imparts a negative pressure to the engine. In another embodiment, one or more vanes is provided as a plurality of vanes along a length of pipe forming part of an exhaust system of the internal combustion engine, the vanes being arranged at an angle to the axis of the pipe.

Also disclosed here in is a method of exhausting an internal combustion engine. The method includes the steps of: receiving a flow of exhaust gases from an internal combustion engine into an exhaust passage; permitting a flow of a portion of the exhaust gases or a release of pressure from the exhaust passage into an expansion chamber, where the expansion chamber may be disposed substantially at the exhaust passage in fluidic communication with the exhaust passage. The method further includes the steps of: generating a vortex in the flow of exhaust gases; and expelling the exhaust gases from the exhaust passage such that at least a portion of the gases that are expelled include a torsional component. The vortex generated may impart a negative pressure to the engine.

BRIEF DESCRIPTION OF THE DRAWINGS

In order that the invention may be more readily understood and put into practical effect, reference will now be made to the accompanying drawings which illustrate one or more preferred embodiments of the invention and wherein:—

FIG. 8A is a is a diagrammatic sectional view of a exhausting apparatus for the exhausting internal combustion engines according to another embodiment of the invention incorporating a silencer or muffler function;

FIG. 8B is a diagrammatic view of the exhausting apparatus of FIG. 8A depicting the components of an exemplary embodiment prior to its assembly;

FIG. 9A is a is a simplified diagrammatic sectional view of an exhausting apparatus for the exhausting of internal combustion engines according to another embodiment of the invention incorporating a silencer or muffler function;

FIG. 9B is a diagrammatic side view of the exhausting apparatus of FIG. 9A;

DETAILED DESCRIPTION

Figure 1:
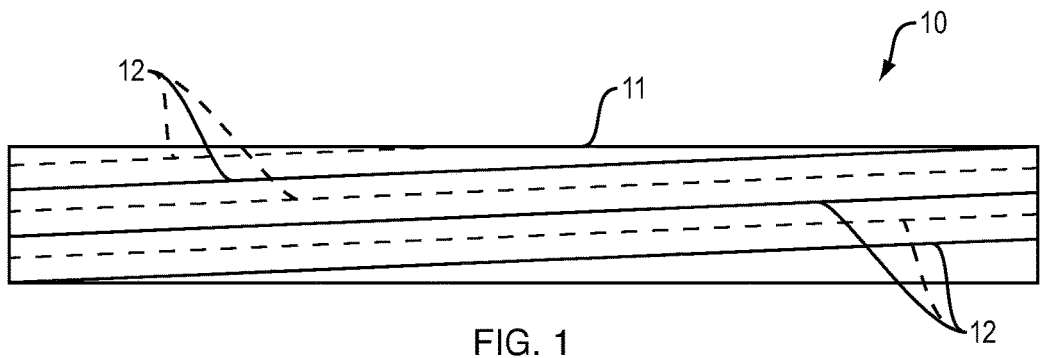
FIG. 1 is a diagrammatic sectional view of an exhausting apparatus for exhausting internal combustion engines according to an embodiment of the invention having six vanes.
Figure 2:
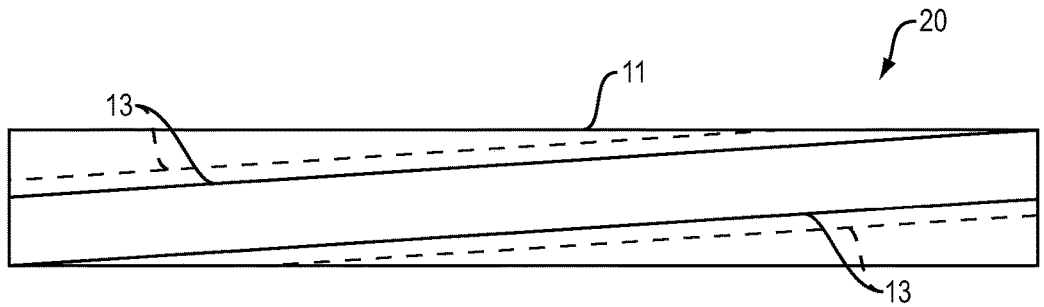
FIG. 2 is a diagrammatic view of an exhausting apparatus for exhausting internal combustion engines similar to that of FIG. 1, but having four vanes.
Figure 3:
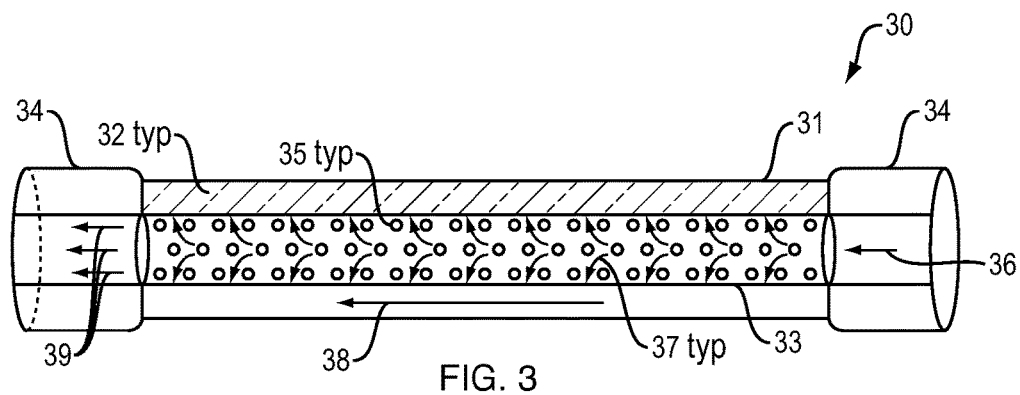
FIG. 3 is a diagrammatic sectional view of exhausting apparatus for exhausting internal combustion engines according to the invention and having a perforated inner tube, and no wadding for sound in the space between the perforated inner tube and the solid outer tube.

The exhausting apparatus or pipe 10 shown in FIG. 1 includes a tube 11 having six vanes 12 extending the length thereof, but formed into a spiral, turning approximately 90° around the circumference of the pipe, each vane being given reference numeral 12, three of which are represented in broken outline and the other three in solid outline. In FIG. 2, the exhaust system tube 20 has four vanes shown typically at 13, two of which are shown in broken outline and two in solid outline. The pipe assembly 30 shown in FIG. 3 has an outer tube 31 coaxially surrounding an inner tube 33 through part of its length, the outer tube ending in two bell ends 34. The outer tube has a plurality of spiralled vanes shown typically at 32 extending between the inner face of the outer tube 31 and the outer face of the inner tube 33. The inner tube 33 also has a plurality of apertures or perforations 35 set out on a regular diamond pattern about the circumference.

Exhaust gases can pass into the inner tube 33 in the direction of arrow 36 and some of the gas can pass through the perforations 35 in the direction of arrows shown typically at 37, some of the gas passing along the annular region between the inner and outer tubes in the direction of arrow 38 and the remainder passing through the centre of the inner tube 33 in the direction of the arrow 39. Exhaust gases enter into the vortex portion through the mesh (inner tube) 33 and into a vortex chamber to create a vacuum from high speed spinning. In larger pipes, six vanes or blades can be used instead of four, and the pitch of the vanes can be provided at the appropriate angle to the axis of the pipe for imparting the torsional component to the gas flow.

Figure 4:
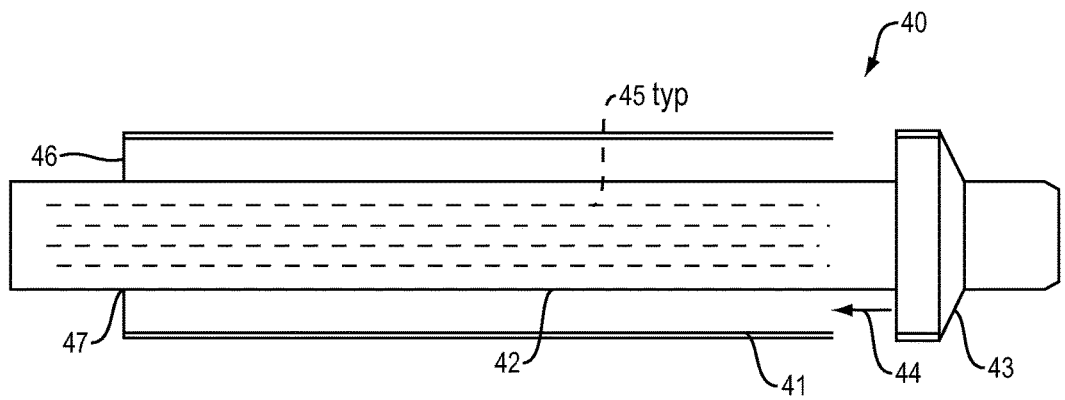
FIG. 4 is a diagrammatic sectional view of exhausting apparatus for exhausting internal combustion engines according to the invention and including an inner tube having vented sound slots.

The exhausting apparatus 40 shown in FIG. 4 is a very basic internal view of a vortex muffler according to the invention. The outer volume may change for decibel rating, but the inner tube will generally not change except in length to create the vortex effect. The muffler has an outer tube 41 and an inner tube 42 concentrically therein and extending beyond the length of the outer tube 41. An end plate 43 may be used to seal off one end of the annular portion between the inner and outer tubes by sliding the inner tube 42 relative to the outer tube 41 in the direction of arrow 44. Once the inner and outer tubes are in their respective relative positions, an annular end plate 46 may be welded in place around the inner tube at 47. The inner tube has a plurality of vented sound slots shown typically at 45.

Figure 5:
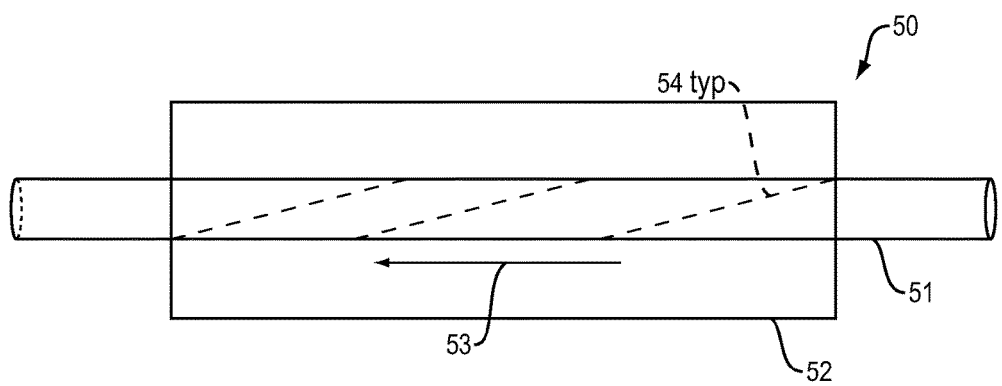
FIG. 5 is a diagrammatic sectional view of exhausting apparatus for the exhausting internal combustion engines according to the invention incorporating a silencer function.
Figure 6:
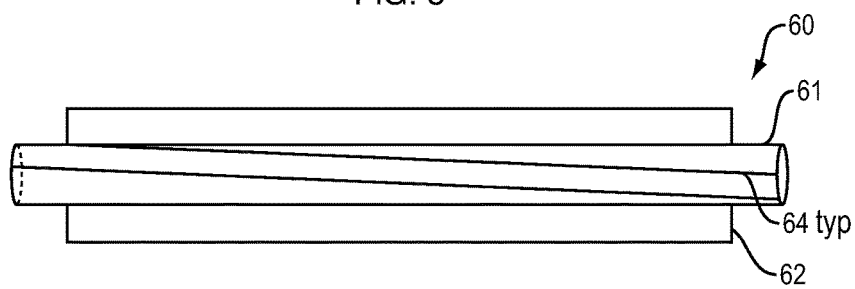
FIG. 6 is a diagrammatic sectional view of exhausting apparatus for exhausting internal combustion engines incorporating the tube of FIG. 2 into a basic muffler.

The turbo muffler version of the exhausting apparatus 50 is shown in FIG. 5 and is designed to give both large and small engines maximum performance, and be most effective in sports type vehicles that require to have a muffler that does not exceed decibel ratings. The exhaust pipe 51 passes through the silencer portion 52 and exhaust gases can pass therethrough in the direction generally of arrow 53, the vortex effect being created by the provision of vanes in the exhaust pipe 51 in accordance with the invention as shown typically at 54. A version of exhausting apparatus according to the invention similar to that shown and described in FIG. 5 is shown in FIG. 6, the reference numerals therein referring to similar parts to those of FIG. 5, but preceded by a "6" instead of a "5".

Figure 7:
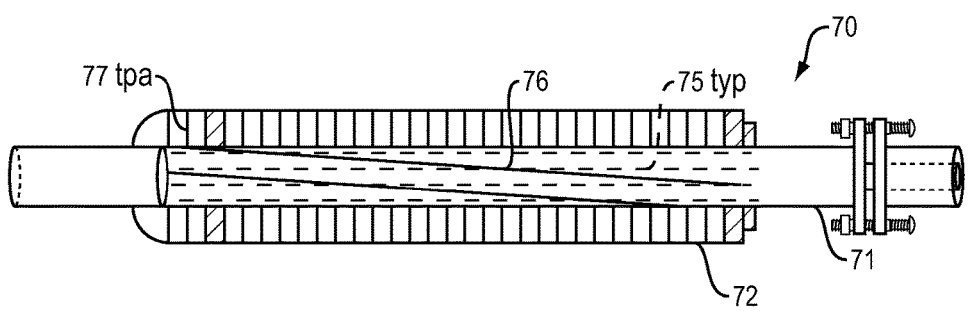
FIG. 7 is a diagrammatic sectional view of exhausting apparatus for exhausting internal combustion engines according to the invention showing a fully detachable muffler.

A fully detachable muffler is shown in FIG. 7, the sound baffles shown typically at 77, the vanes shown typically at 74 extending through the pipe 71, and a plurality of slots shown typically at 75 being provided along the length of the pipe within the muffler box 72.

In a preferred embodiment, one or more vanes of substantially constant width are formed into a spiral, turning around the circumference of the exhaust passage, and configured to impart a high speed spinning of exhaust gas in the central exhaust passage of the exhaust system, with the proviso that neither a configuration of vanes nor any other structure within the exhaust passage restricts or obstructs the flow of said exhaust gases in the central exhaust passage. A low pressure is formed on the outside surface of the fins, the low pressure also causing an increase in exhaust gas velocities. What all this does working together is a pulling of air and heat from the cylinder chamber by evacuating it faster than it can be original pushed by increasing velocity as it passes through the system. By lowering the engine cylinder temperature, it is priming the engine for a more thermally productive burn. Producing more power per detonation while at the same time producing a thermally productive burn that reduce PM production and emission.

The Hybrid Exhaust System:

A description of preferred embodiments of the disclosed hybrid exhaust system follows. It will be understood that the particular embodiments of the invention are shown by way of illustration and not as limitations of the invention. At the outset, the invention is described in its broadest overall aspects, with a more detailed description following. The features and other details of the system and methods of the invention will be further pointed out in the claims.

As shown in FIG. 8A, in one embodiment of the hybrid exhaust system, similar to above-described embodiments, a hybrid exhaust system for exhausting an internal combustion engine includes: a central exhaust pipe 86 for directing flow of exhaust gases from the engine along an axis of the exhaust pipe 86; one or more vanes 12 extending substantially the length of the exhaust pipe 86 and formed into a spiral, turning around the circumference of the exhaust pipe 86, and with a first edge mounted to an internal face of the exhaust pipe 86, and a second edge spaced inwardly from and substantially coaxial with the internal face, said one or more vanes 12 being of substantially constant width and being disposed in angular relationship to the axis of the exhaust pipe 86, and configured to impart a circular, torsional component to at least a portion of said exhaust gases while passing through said exhaust pipe 86, with the proviso that a configuration of vanes 12 does not restrict or obstruct the flow of said exhaust gases.

A preferred embodiment of the above-disclosed system pulls exhaust gas and heat from the cylinder chamber and evacuates it, increasing the velocity of the gas as it passes through the system. By lowering the engine cylinder temperature, the disclosed system primes the engine for a more complete burn of fuel, producing increased power per detonation while at the same time reducing carbon and hydrocarbon emission.

However because of exhaust system size limitations on certain vehicles, we invented a hybrid system that is shorter and can be accommodated in a smaller space. In a disclosed embodiment, the power pipe and muffler are combined into a single piece. The hybrid exhaust system is arranged to increase the spin of exhaust gases generated by a turbo engine or a standard exhaust gas flow from a non-turbo engine as the exhaust gas enters the central pipe 86 in the direction of arrow 82 in FIG. 8A. As used herein, the terms "perforated central exhaust pipe 86," and the "power pipe 86," are each synonymous with "central pipe 86," and as such, the terms may be used herein interchangeably.

As depicted in FIG. 8A, another difference between the systems disclosed previously herein and the hybrid exhaust system is a continuous outer sleeve that is used as an expansion chamber comprising a front expansion chamber 28b within power pipe shell 28 and a downstream expansion chamber 89 within muffler shell 88b, the front expansion chamber 28b and the downstream expansion chamber 89 being connected by a center ring 84. In one embodiment of the invention, center ring 84 allows the passage of air pressure to flow from a smaller diameter power pipe, that is, perforated central pipe 86, which can be, e.g., a four (4) inch diameter perforated pipe, to a larger diameter pipe, e.g., a five (5) inch diameter power pipe shell 28, and then from the five inch diameter power pipe shell 28 into, e.g., a six (6) inch diameter outer sleeve pipe or exterior muffler shell 88b, the flow as in a single expansion chamber.

The inventors of the hybrid exhaust system have discovered, in one embodiment of the invention, a system that combines the central pipe or power pipe 86 and the muffler portion 88A into a single piece, using the spin of exhaust coming from a turbo engine or from an exhaust flow of a non-diesel or standard combustion engine to produce an effect similar to that of the power pipe described above for non-hybrid versions of a disclosed exhaust system, e.g., a two or a three piece exhaust system, in a much shorter distance. This disclosed combination makes the hybrid exhaust system a compacted unit about the same length as the original power pipe alone. For example, in one embodiment, from an earlier system length of about 110 inches using a separate power pipe and muffler, the new system length is shortened to approximately 45 inches as a hybrid exhaust system. In a freightliner or a tow truck, e.g., wherein the space available for the exhaust system is very limited, such that the length of the system can be a significant problem, the hybrid exhaust system can reduce the length of an exhaust system by about fifty percent (50%) to about sixty percent (60%).

Figure 8D:
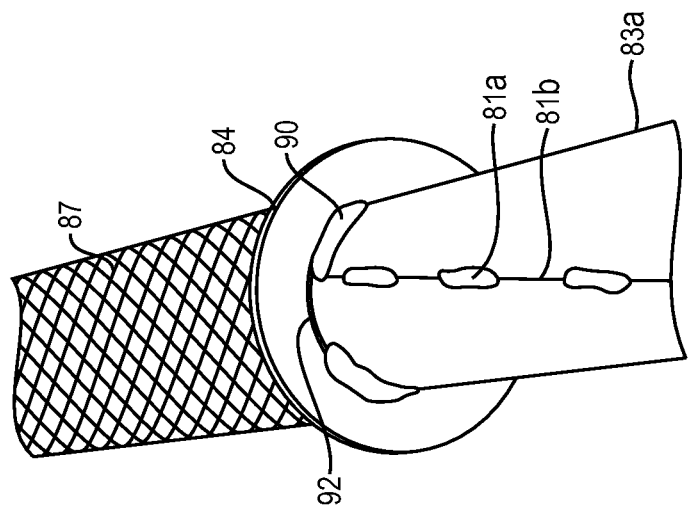
FIG. 8D is a diagrammatic perspective view of the exhausting apparatus of FIG. 8A depicting a center ring joining the exterior shell of the muffler section to the central pipe and to the exterior shell of the power pipe in an exemplary embodiment.
Figure 8C:
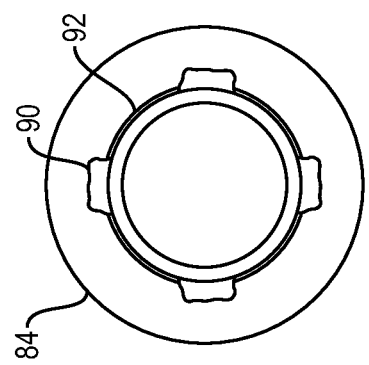
FIG. 8C is a diagrammatic view of the exhausting apparatus of FIG. 8A depicting and end view of the components of an exemplary embodiment.

As described above, the hybrid system includes a continuous expansion chamber, such as, for example, an expansion of exhaust gas from about 4 inches to about 5 inches to about 6 inches, an expansion or release of pressure that travels the length of the system, relieving pressure on the fins 12 in the central pipe 86 and increasing exhaust flow through the central pipe 86. As shown in FIGS. 8C and 8D, the center ring 84 that joins, e.g., the 5 inch and 6 inch pipes to the 4 inch central pipe 86 has pressure slits 92 at the bottom to allow the pressure to be released throughout the entire outer sleeve or continuous expansion chamber that surrounds the internal system. To summarize, typically in the front part of the hybrid, pressure is released from, e.g., a 4 inch to a 5 inch cavity, providing a one-half (½) inch expansion all around for releasing pressure from the 4 inch central pipe. Where the muffler section begins, is the center ring which allows a fluid connection to the 6 inch diameter pipe or muffler shell. This provides a total expansion of 1.5 inches all around from the original 4 inch central pipe. The venting holes, or in one embodiment, openings between the welds attaching the center ring 84 to the inner solid pipe 83A, allow pressure to transfer from the 5 inch pipe to the 6 inch pipe without having to move back into the high flow air in the central pipe 86 to move from the first expansion chamber to the second expansion chamber.

Referring again to FIG. 8A, a basic internal view of a hybrid exhaust system is shown generally as 80A according to an exemplary embodiment of the invention. The hybrid exhaust system includes a power portion or upstream portion 28a and a downstream or muffler portion 88a. The direction of incoming exhaust gas flow is shown by arrow 82a and exiting exhaust gas flow by arrow 82b. As the term is used herein, the hybrid exhaust system 80A includes a continuous expansion chamber surrounding substantially the length of a vaned section of a perforated central exhaust pipe 86, the continuous expansion chamber formed from at least two fluidically connected chambers including a front expansion chamber 28b within exterior shell pipe 28 surrounding a front or upstream portion of exhaust pipe 86 and a downstream expansion chamber 89 within the exterior muffler shell 88b surrounding a downstream portion of perforated central exhaust pipe 86.

Central pipe 86 is shown in FIGS. 8A and 8B with perforations 86b, diagonal cuts 81b for insertion of fins or vanes, with welds of vanes 81a.

In the embodiment depicted in FIG. 8A, the means for fluidically connecting the front expansion chamber 28b and the downstream expansion chamber 89 is a center ring 84. The center ring 84 joins two exterior shell pipes, that is, exterior shell pipe 28 and exterior muffler shell 88b, with the perforated central exhaust pipe 86, the resulting structure including, in one embodiment, an approximate one-eighth (⅛th) inch space between the center ring 84 and the perforated central exhaust pipe 86 to allow for expansion of exhaust gases. In another embodiment, the space between the center ring 84 and the perforated central exhaust pipe 86 is from about one-sixteenth (1/16th) inch to about one-fourth (¼th) inch. In FIGS. 8C and 8D, the space 92 is indicated between the center ring 84 and the central pipe 86.

In general, the length, outer volume, and/or circumference of the hybrid exhaust system 80A may change as required to provide for a desired decibel rating. However, the dimensions of the inner tubes need only be sufficient to create the desired vortex effect in the perforated central exhaust pipe 86 for a given flow. The hybrid exhaust system 80A has an exterior shell pipe 28 and an exterior muffler shell 88b, the outer tubes 28 and 88b, disposed substantially concentrically over the perforated inner tube 86, and an solid inner end tubes 83a attached to the inlet end and 83b attached to the outlet end, of the perforated inner tube 86 by means of a press-fit. Similar to the earlier embodiments, the hybrid exhaust system 80A includes two primary sections, a power section 28A initiating at the inlet and a sound absorption portion or muffler 88A encased in outer tube 88b. In one embodiment of the hybrid exhaust system, the perforated central exhaust pipe or central pipe 86 has a diameter of about four (4) inches; the power pipe shell 28 has a diameter of about five (5) inches; and the exterior shell of the muffle 88b has a diameter of about six (6) inches. Other diameters are within the scope of the disclosed invention.

Unique to this embodiment are the expansion chambers 28b and 89, in fluidic communication with one another to form a continuous expansion chamber and further, which permit the expansion of gases from the power section and sound absorption section, respectively thereby relieving the pressures from the inner tube 83a and perforated inner tube 86.

Once the inner tubes 86, 83a, and 83b as well as the outer tubes 28 and 88b are in their respective relative positions, annular end ring or plate 85a in an upstream position near the inlet end may be used to seal off one end of the annular portion between the inner tube 83a and outer shell pipe 28.

Annular end ring or plate 85b in a downstream position may be used to seal off one end of the annular portion between the inner tube, 83b and muffler shell 88b. In one embodiment, center ring 84 joins the two exterior shell pipes, muffler shell 88b and outer tube 28, forming a continuous outer sleeve used as a continuous expansion chamber. The center ring 84 allows the passage of air pressure to flow from the front expansion chamber 28b within outer tube 28 surrounding an upstream portion of perforated central exhaust pipe 86 to the downstream expansion chamber 89 within muffler shell 88b. The fluidic connection between the first and second expansion chambers is not limited to a center ring as shown in the figures. Any suitable fluidic connection allowing a release of pressure or release of a portion of gas from the first to the second expansion chamber is within the scope of this invention. For example, in another embodiment the fluidic connection can be an annular shaped partition substantially separating the first and the second expansion chambers from one another and surrounding and in contact with a portion of an outer surface of the central exhaust passage, the annular shaped partition having at least one orifice thereon, the orifice communicating with the first and the second expansion chambers and providing the fluidic communication therebetween. In another non-limiting example, an end wall of each of the first and the second expansion chambers may be in contact with one another, or one end wall could be shared by both expansion chambers, and the end wall could have at least one aperture or opening that provides a fluid connection between the expansion chambers, and forms one continuous expansion chamber.

Turning to FIG. 8B as well for a diagrammatic depiction of the construction and assembly of the inner portions of the hybrid exhaust system 80A, the inner portion of the exhaust system 80A is comprised of an inner pipe assembly as shown generally as 80B in FIG. 8B. The inner portion of the inner pipe assembly 80B includes inner tubes 83a and 83b disposed substantially coaxially surrounding a portion of perforated central exhaust pipe 86, the inner tubes 83a and 83b pressure fit over a portion of the perforated central exhaust pipe 86 at the inlet end and the outlet end, respectively. The perforated central exhaust pipe 86 forms a venting portion of the inner pipe, typically slotted or perforated pipe or the like.

Turning now to FIG. 8C, a cross-sectional representation of a central pipe 86 is shown with center ring 84 welded to central pipe 86 at welds 90, with spaces 92 between welds 90. FIG. 8D is a diagrammatic perspective view of a portion of the exhausting apparatus of FIG. 8A depicting a center ring 84 joining the power pipe shell, i.e., exterior shell pipe 28 in the upstream portion 28A of the hybrid exhaust system and a portion of central pipe 86 covered with a stainless steel mesh sock 87 in a downstream portion 88A of the hybrid exhaust system. As shown in FIG. 8A, center ring 84 also is joined to the exterior shell 88b of the muffler section 88A in an exemplary embodiment.

FIG. 9A is a basic cutaway internal view of a hybrid exhaust system similar to the embodiments depicted in FIGS. 8A through 8D. As shown in FIG. 9A, the inner portion of the central pipe or power pipe 86 has a plurality of spiraled vanes 12 extending in a helical cut or slot 81b (shown in FIG. 8A) along a substantial portion of its length. In constructing one embodiment of the hybrid exhaust system, prior to making the helical cut 81b, the central pipe 86 is slid into inner solid pipe 83a as shown in FIGS. 8B and 9A, and press-fit against a portion of the inner surface of solid pipe 83a. Then the helical cut 81b is made through the wall of inner solid pipe 83a and the perforated inner power pipe 86 The fins 12 are then welded in place, preferably two at a time, leaving a space 81b between the welds 81a in order to allow pressure to expand from central pipe 86 to the front expansion chamber 28b within power pipe shell 28. In larger pipes, six vanes or blades can be used instead of four, and the pitch of the vanes can be provided at the appropriate angle to the axis of the pipe for imparting the torsional component to the gas flow depending on the designed flows, diameter, and length of pipes.

In another exemplary embodiment, as described in earlier embodiments, the vanes 12 are welded in the slots at intervals along their respective lengths leaving, as shown in FIG. 8D, spaces 81b between the welds 81a and maintaining the vanes 12 in a radial direction and substantially perpendicular to the surfaces of the perforated inner power pipe 86 and inner solid pipe 83a turning approximately a desired angle of 90 degrees around the circumference. These spaces 81b permit a portion of the swirling exhaust gases to escape from the flow inside the perforated inner power pipe 86 and thereby relieving a portion of the pressures in power pipe 86 induced on the vanes 12, with a resulting increase in exhaust gas speed.

Exhaust gases pass into the power pipe 86 in the direction of arrow 82a, and continue down the power pipe 86 being swirled by the vanes 12 to create a vacuum from high speed spinning and thereby increasing flow. Some pressure is released through the perforations 86b into the front expansion chamber 28b and the downstream expansion chamber 89. Expansion chambers 28b and 89 are fluidically connected through center ring 84, forming a single continuous expansion chamber.

Continuing with FIG. 9A, the hybrid exhaust system 80A includes two primary sections, first, a power section 28A initiating at the inlet of pipe 83a at least a portion of which is encased in outer tube 28, and secondly a downstream sound absorption portion 88A encased in outer tube 88b. The center ring 84 (not shown in FIG. 9A) is sealed to both the outer tubes 28 and 88b to limit the escape of gases from the sound absorption portion. Furthermore, as shown in FIGS. 8C and 8D, the center ring 84 is secured to the inner solid pipe 83a preferably with welds 90 again and leaving spaces 92 distributed around the circumference of the pipe 83a and inside circumference of the annular center ring 84. Advantageously, the spaces 92 permit a portion of gases to pass into the expansion chambers 28b and 88b through the spaces 92 on pipe 83a.

In one embodiment, the front expansion chamber 28b is a one-half (½) inch space between the 4 inch solid pipe 83a and the 5 inch solid pipe 28. As described, in constructing the hybrid system, the perforated central pipe 86 is press-fit inside solid pipe 83a; both pipes are slit while together; the fins are inserted and welded 81a. Pressure can escape from slits 81b between welds 81a into the front expansion chamber 28b.

Continuing with FIG. 8A, for teaching of the construction of the sound absorption portion of the muffler 88a, in one exemplary embodiment of the muffler 88a, a portion of the perforated central exhaust pipe 86 in the muffler portion is covered or wrapped with a vibration-absorbing material 87. For example, in one embodiment, in order to minimize vibrations, a stainless steel mesh or matrix material, referred to herein as a "stainless steel mesh sock" 87 surrounds the perforated pipe or central pipe 86 substantially along the length of the downstream expansion chamber 89. The downstream expansion chamber 89 comprises the space between the stainless steel mesh sock 87 and the muffler shell 88b.

As shown in FIG. 9A, in an exemplary embodiment, to facilitate sound attenuation, a fiberglass mesh or other sound absorption material 89b may be wrapped around the central pipe 86 and/or vibration-absorbing material 87. The sound absorption material 89b may fill a substantial portion of the downstream expansion chamber 89 within muffler shell 88b, and redirects and attenuates the sound waves traveling with the exhaust gases in direction of flow 82b, thereby reducing the overall noise transmitted to the external environment. For example, in one embodiment the space between the stainless steel sock 87 and the outer casing 88b of the muffler may be filled with about five or six inches of sound-absorbing fiberglass material, and baffling fins may re-direct much of the vibration and sound into the sound-absorbing material. In the muffler section 88A, pressure escapes through perforations 86b and through slits 81b between fin welds 81a, through the stainless steel mesh sock 87 and into the ceramic or fiberglass-filled space 89 within the exterior muffler shell 88 b, which functions as the downstream expansion chamber 89.

FIG. 9B is a side elevational external view of a hybrid exhaust system depicted in the sectional view of FIG. 9A.

Figure 10A:
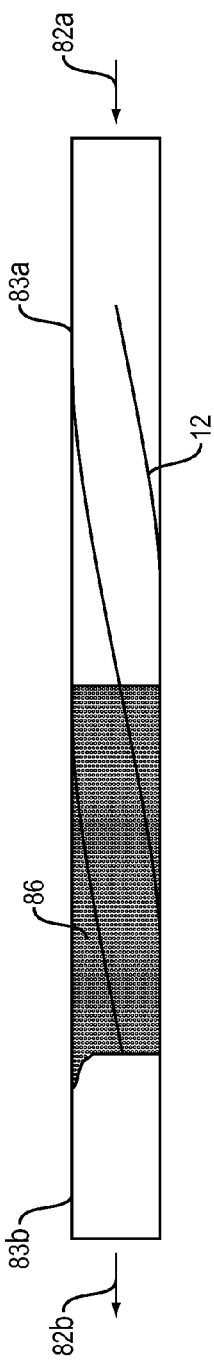
FIG. 10A is an assembly view of the exhausting apparatus of FIG. 9A depicting the innermost layer with perforated pipe and vane construction.
Figure 10B:
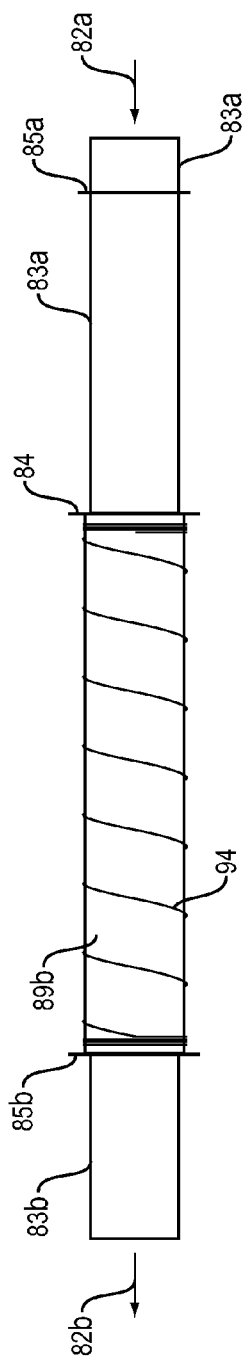
FIG. 10B is another assembly view of the exhausting apparatus of FIG. 9A depicting another layer and inner construction of the muffler portion of the exemplary embodiment.
Figure 10C:
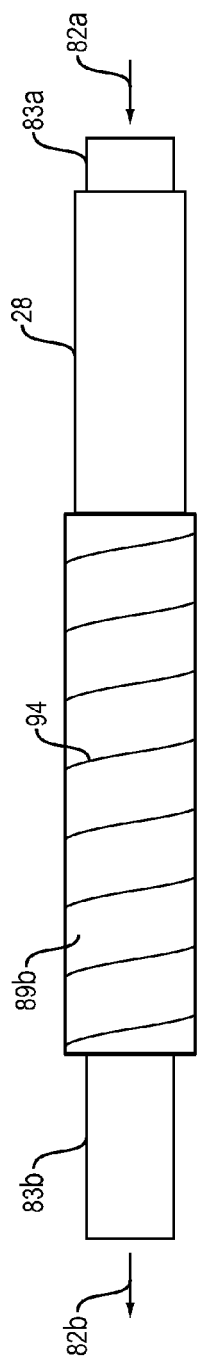
FIG. 10C is another assembly view of the exhausting apparatus of FIG. 9A depicting yet another layer and construction of the exemplary embodiment.

FIGS. 10A through 10C depict that, one exemplary embodiment of the hybrid exhaust system, a portion of the perforated central exhaust pipe 86 in the muffler portion is covered or wrapped with a sound absorbing material 89b, for example fiberglass, that is secured by means of a wire 94 spirally wrapped around the sound absorbing material 89b along the length of the muffler portion (between the center ring 84 and end ring 85b. The sound absorption material redirects and attenuates the sound waves generated by the combustion engine and the exhaust gases, thereby reducing the overall noise transmitted to the environment by the disclosed hybrid exhaust system.

In yet another embodiment of the invention, a device for retrofit into an existing exhaust system is described. The inner perforated material with the fins, for example four fins or six fins, can be inserted into some existing exhaust systems. While this is not feasible for some applications, it can be used for motorcycles and many off-road utility vehicles to increase performance. The disclosed solid and perforated pipe with fins can be inserted into an existing exhaust pipe, and the ends of the insert expanded to meet the diameter of the existing pipe for a tight fit to secure the perforated pipe in place. The stainless steel sock and the ceramic or sound absorbing material would not be added.

Referring now to FIGS. 1, and 2 depicting a basic internal view of a power pipe shown generally as 10, and which is positioned upstream of a muffler for yet another exemplary embodiment, employing the same reference numerals for simplicity. In this embodiment, an exhaust system insert is described such as may be employed with an existing exhaust system structure. In such a structure the insert 10 may be inserted into an existing exhaust structure, and the ends expanded to seal and secure it in place within the exhaust structure.

Once again, in general, while the length, outer volume, and/or circumference of the insert may change as required to fit within the existing exhaust system, the perforated pipe and vanes need only be sized to achieve the desired vortex effect for a given flow, thereby increasing the flow through the exhaust system and improving flow and efficiency. The insert has an inner tube 11 forming a venting portion of pipe, typically slotted or perforated pipe or the like. Like other embodiments, the inner portion of the insert has a plurality of spiralled vanes 12 extending in a helical cut or slot in the perforated tube 11 along its length. In an exemplary embodiment, as described earlier, the vanes 12 are welded in the slots at intervals along their respective lengths leaving spaces between the welds and maintaining the vanes 12 in a radial direction and substantially perpendicular to the surfaces of the perforated inner tube 11 and turning approximately an angle of 90° around the circumference. As with the earlier embodiments, the spaces permit a portion of the exhaust gases to escape from the flow inside the perforated inner tube 11 as it swirls flowing by the vanes 12 and thereby relieving in the pressures in the tubes induced on the vanes 12 as the exhaust gas swirls forming the vortex described earlier.

Figure 11:
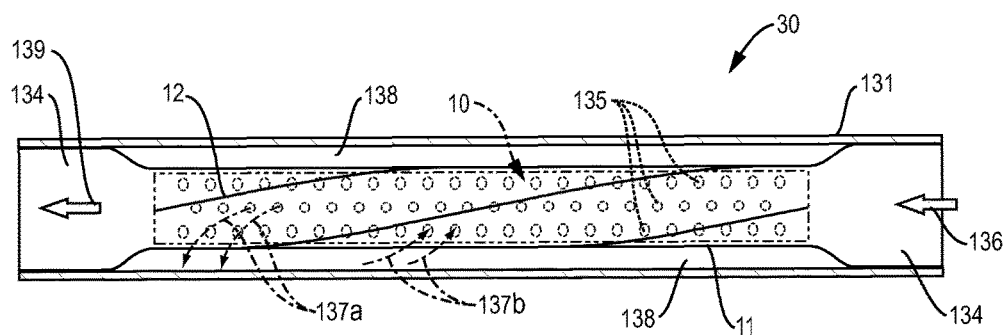
FIG. 11 is a diagrammatic section view of the insert device for exhausting internal combustion engines in accordance with an exemplary embodiment depicting a perforated inner tube and vanes as inserted into an existing exhaust pipe.
Figure 12:
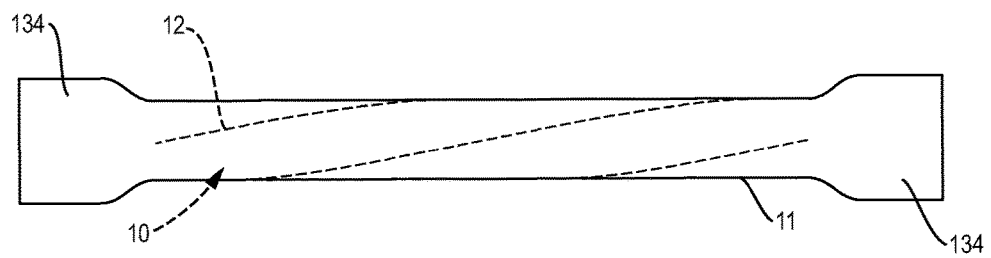
FIG. 12 is a diagrammatic section view of the insert device for exhausting internal combustion engines depicted as an insert with vanes and venting in accordance with an exemplary embodiment.
Figure 13:
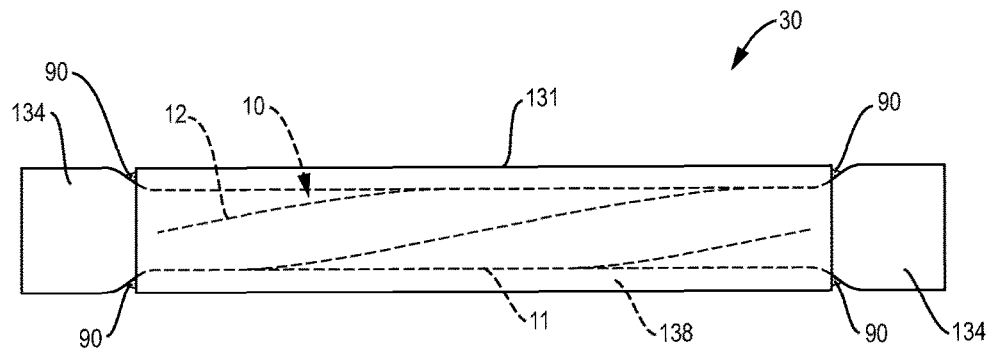
FIG. 13 is a diagrammatic section view of the insert device for exhausting internal combustion engines depicted as an insert to and existing exhaust pipe in accordance with an exemplary embodiment.

Referring now to FIGS. 11-13 there is depicted as yet a further embodiment of the invention, another device or insert for retrofit into an existing exhaust system described similar to that described above with reference to FIGS. 1-3 employing the same reference numerals for simplicity. Referring now to FIGS. 11-13 generally, and in particular FIG. 11, as sectional cutaway view of a power pipe shown once again generally as 30. In this embodiment, an exhaust system insert is described such as may be employed with an existing exhaust system structure. In such a structure the insert 11 may be inserted into an existing exhaust pipe 131 structure, and the ends sealed to secure it in place within the existing exhaust pipe 131 and utilizing the existing structure, the existing exhaust pipe 131 forming the pipe assembly 30 with the existing exhaust pipe 131 as the outer tube 31 (see FIG. 3). The insert 11 in an embodiment once again includes an inner pipe 10 forming a venting portion of pipe, typically slotted or perforated pipe or the like. Like other embodiments, the inner portion of the inner pipe 10 of the insert 11 has a plurality of spiralled vanes 12 extending over at least a portion of the length thereof, formed into a spiral turning approximately 90° around the circumference of the inner pipe 10. In the figure just three vanes 12 are depicted for simplicity and are represented by the three solid lines. Similar to that describe earlier, the vanes 12 extending in a helical cut or slot in the inner pipe 10 along at least a portion of its length. In an exemplary embodiment, as described earlier, the vanes 12 are welded in the slots at intervals along their respective lengths leaving spaces between the welds and maintaining the vanes 12 in a radial direction and substantially perpendicular to the surfaces of the perforated inner tube 10 and turning approximately an angle of 90° around the circumference. As with the earlier embodiments, the spaces permit a portion of the exhaust gases to escape from the flow inside the perforated inner tube 10 as it swirls flowing by the vanes 12 and thereby relieving in the pressures in the tubes induced on the vanes 12 as the exhaust gas swirls forming the vortex described earlier. While three vanes 12 and a perforated inner tube 10 are described herein with respect to an exemplary embodiment, it should be well appreciated that other numbers of vanes, spiral, pipe, connection, and configurations thereof may be employed as previously described with respect to other embodiments.

Once again, in general, while the length, outer volume, and/or circumference of the insert may change as required to fit within the existing exhaust system, the inner pipe 10 and vanes 12 need only be sized to achieve the desired vortex effect for a given flow, thereby increasing the flow through the exhaust system and improving flow and efficiency.

Continuing now with FIGS. 11-13, the pipe assembly 30 of an embodiment has an outer tube 131 coaxially surrounding an inner tube 11 over at least part of its length, the inner tube 11 ending in two bell ends 134 of a diameter larger than the inner pipe 11, where the bell ends 134 are sized to fit securely within the inner diameter of the existing exhaust tube 131. The bell ends 134 of the inner pipe 11 may be and at least partially sealed or fixed with welds 90 or otherwise. Like other embodiments described herein, the inner tube 11 may also have a plurality of apertures or perforations 135 set out on a pattern about the circumference and length of the inner tube 11.

Exhaust gases enter into the perforated inner tube 10 and solid tube 11 in the direction of arrow 136 and some of the gas can pass through the perforations 135 in the direction of arrows shown typically at 137a, and 137b, some of the gas passing along the annular region 138 between the inner tube 11 and the remainder passing through the center of the inner tube 11 in the direction of the arrow 139. Some gases can also pass in and out through openings at welds of the vanes 12. The vanes 12 may be welded through both the solid tube 11 and the perforated tube 10. Under some conditions, a portion of the gases that have entered the expansion chamber 138 may pass back through the perforations 135 in the direction of arrow 137b to continue flow out of the pipe assembly 30 in the direction of arrow 139. The annular portion between the inner tube 11 and the outer tube 131 forms an expansion chamber permitting some of the gases from the inner tube 11 to pass through the perforations 135 in the inner tube to the to the annular region 138, providing a pressure relief for the gases as they enter the pipe assembly 30. The expansion chamber 138 may provide a pressure relief for pressure pulses or waves as they travel down the exhaust assembly 30.

Exhausting apparatus for exhausting internal combustion engines according to the invention may be attached to the exhaust manifold of an existing engine or new engine as the case may be. The system of the present invention is believed to be a breakthrough in engine technology and can enhance turbo and cyclone or ram-flow induction. The system of the present invention is believed to provide a new dimension in exhaust gas flow allowing internal combustion engines to breathe more efficiently. It is believed that the inertial component of the torsional flow will improve cylinder filling and create maximum power by drawing a vacuum on the exhaust of the engine. Experimental use of the exhausting apparatus according to the invention has provided horsepower gains of fifteen percent (15%), gas flow gains of twenty-five percent (25%) or better, top end gain has been found to be even better than this. Dynamometer testing has shown lower carbon monoxide emissions, less fuel usage (15% to 20%) and much smoother running. It is believed that any internal combustion engine will benefit from the efficiencies created by gas flow by the installation of apparatus according to the invention. It is also believed that apparatus according to the invention minimizes the problems that have been introduced in modern engines in respect of tubes, lines and pipes from different parts of the engine including the crank case, sump, carburetor, air filter and other parts of the engine in order to minimize emission of unburnt hydrocarbons.

In use, it is believed when installed on an internal combustion exhaust system, when the engine is running, gas starts to spin as it strikes the spiral fins in the turbo pipe, thus creating a vacuum that minimizes velocity dampening that is caused by bends and other obstructions in the exhaust pipe or manifold. It is believed that exhausting apparatus according to the present invention will benefit engines by providing a greatly reduced back pressure to the manifold and valves, carbon monoxide may be reduced by the engine burning cleaner, reduced deposits in the manifold and the exhaust pipe are believed to occur, and exhaust emissions are believed to be cleaner and environmentally more friendly. In addition to the above, it is believed a better all round engine performance can be achieved.

Dynamometer testing has shown significant improvement in horsepower, by comparison with the system being disconnected and running straight through pipe, relatively the vortex system of the present invention made a thirteen percent (13%) gain in horsepower on a standard automotive engine exhaust system with the inclusion of a vortex muffler according to the invention. It is presumed that more gain is possible. Moreover, testing has shown reduced manifold pressure and better mode of performance in every aspect.

It is believed that by providing a plurality of non-exclusive spiral passages in the exhaust system in accordance with the invention imparts a higher degree of angular momentum than has been provide by prior systems. Whilst not being bound by theory, nor limiting the scope of this invention thereto, the non-exclusive nature and radially displaced disposition of the axially elongate spiral baffles of the present invention can afford at least an opportunity for angular pseudo-forces such as the Coriolis effect and such like to be effected by providing a non-inertial reference frame within which cooling, and therefore, contracting gases with density increasing can pass. Such an effect may enhance negative back pressure to the combustions chamber during the exhaust cycle and assist in scavenging the combusted gases therefrom.

The exhausting apparatus of the present invention may also produce a cyclonic effect along the exhaust pipe. The cyclonic effect may extend from the location of the vanes which induce the angular component of exhaust gas flow back towards the exhaust manifold engine. Irrespective of whether a cyclonic effect is produced and whether such an effect extends back towards the exhaust manifold, while the invention is not to be construed as being limited to such an effect, it is believed that an increase in negative back-pressure to the exhaust system is effected when the invention as described herein is in use. The disclosed hybrid exhaust system may further include an outside gas induction means arranged in operative association with one or more vanes in the central pipe for imparting a torsional component to at least a portion of said exhaust gases as they pass through the exhaust passage.

Although the invention has been described with reference to specific examples, it will be appreciated by persons skilled in the art that the invention may be embodied in other forms which are encompassed within the broad scope and ambit of the invention as defined by the following claims.

What is claimed is:

1. An insert device for retrofitting into an exhaust system pipe of an internal combustion engine, the insert device comprising:

a perforated inner pipe having a first end and a second end, the first and the second ends sized with each of the first and the second end outer diameter to be fit within an inner diameter of the exhaust system pipe to secure the first and second ends respectively; the inner pipe is positioned as an inner pipe exhaust passage for directing flow of exhaust gases from the engine along an axis of the inner pipe exhaust passage, wherein the inner pipe along at least a portion of its length between the first and second ends, exhibits an outer diameter less than the inner diameter of the existing exhaust system pipe forming an annular expansion chamber between the inner pipe and the exhaust system pipe; and one or more vanes extending over at least a portion of the length of the inner pipe and formed into a spiral, turning around the circumference of the inner pipe, and with a first edge mounted to an internal face of the inner pipe, and a second edge spaced inwardly from and substantially coaxial with the internal face, said one or more vanes being of substantially constant width and being disposed in angular relationship to the axis of the inner pipe, and configured to impart a circular, torsional component to at least a portion of exhaust gases while passing through the insert device, with the proviso that a configuration of vanes does not completely restrict or obstruct the flow of said exhaust gases.

2. The insert device of claim 1, wherein the expansion chamber is disposed substantially at the inner pipe exhaust passage and in fluidic communication with the inner pipe exhaust passage, the expansion chamber capable of permitting a flow of a portion of the exhaust gases or a release of pressure from the inner pipe exhaust passage into said expansion chamber.

3. The insert device of claim 1, including perforations in said inner pipe permitting fluidic communication between said inner pipe exhaust passage and said expansion chamber.

4. The insert device of claim 1, wherein at least one of the first and second ends of the inner pipe are secured partially along their respective circumferences, a partial securement leaving a space configured for permitting the flow of gases into or from the expansion chamber.

5. The insert device of claim 1, wherein the expansion chamber is disposed substantially concentric with the inner pipe exhaust passage.

6. The insert device according to claim 1, wherein said one or more vanes is provided as a plurality of vanes along a length of the inner pipe forming part of an exhaust system of the internal combustion engine, the vanes being arranged at an angle to the axis of the pipe.

7. The insert device of claim 1, wherein the insert device is imparting a negative pressure to the engine.

8. The insert device according to claim 1, wherein the insert device is imparting the imparted torsional component to at least a portion of said exhaust gases and forming a vortex in the exhaust passage.

9. The insert device of claim 1, wherein the exhaust system pipe is an existing exhaust system pipe wherein the insert device is disposed within the existing exhaust system pipe.

10. The insert device according to claim 1, wherein said one or more vanes are located so as to be capable of imparting the torsional component to at least a portion of said exhaust gases passing through the inner pipe exhaust passage between an exhaust manifold and a muffler.

11. The insert device according to claim 1, wherein said one or more vanes are positioned to impart the torsional component to at least a portion of said exhaust gases passing through the exhaust passage downstream from any exhaust system component that is operable to dissipate the torsional component.

12. A method of exhausting an internal combustion engine comprising providing an insert device according to claim 1, wherein the insert device is operable retrofit into an exhaust system pipe of an internal combustion engine:
receiving a flow of exhaust gases from an internal combustion engine into the inner pipe exhaust passage;
permitting a flow of a portion of the exhaust gases or a release of pressure from the inner pipe exhaust passage into an expansion chamber, the expansion chamber disposed at the inner pipe exhaust passage in fluidic communication with the inner pipe exhaust passage;
allowing generating a vortex to generate in the flow of exhaust gases; and
expelling the exhaust gases from the inner pipe; at least a portion of the gases so expelled include a torsional component.

13. The method according to claim 12, wherein the vortex generated imparts a negative pressure to the engine.

14. An insert device for retrofitting into an existing exhaust system pipe of an internal combustion engine, the insert device comprising:
a perforated pipe axially positioned within an existing exhaust system pipe and having a first end and a second end, the first and the second ends being expanded or attached to a connector in order to meet a diameter of the existing exhaust system pipe to secure the perforated pipe in place; the perforated pipe is positioned as an inner pipe exhaust passage operable to direct the flow of exhaust gases from the engine along an axis of the inner pipe exhaust passage;
one or more vanes extending substantially the length of the perforated pipe and formed into a spiral, turning around the circumference of the perforated pipe, and with a first edge mounted to an internal face of the perforated pipe and the existing exhaust system pipe, and a second edge spaced inwardly from and substantially coaxial with the internal face, said one or more vanes being of substantially constant width and being disposed in angular relationship to the axis of the perforated pipe, and configured to impart a circular, torsional component to at least a portion of exhaust gases passing through the insert device, with the proviso that a configuration of vanes does not completely restrict or obstruct the flow of said exhaust gases.

15. The insert device of claim 14, wherein the insert device is imparting a negative pressure to the engine.

16. The insert device according to claim 14, wherein said one or more vanes is provided as a plurality of vanes along a length of the inner pipe forming part of an exhaust system of the internal combustion engine, the vanes being arranged at an angle to the axis of the inner pipe.

17. A method of exhausting an internal combustion engine including providing an insert device according to claim 14, wherein the insert device is operably retrofit into an exhaust system pipe of an internal combustion engine;
receiving a flow of exhaust gases from an internal combustion engine into the perforated pipe;
permitting a flow of a portion of the exhaust gases or a release of pressure from the perforated pipe into an expansion chamber, the expansion chamber disposed at the perforated pipe in fluidic communication with the perforated pipe;
allowing a vortex to generate in the flow of exhaust gases; and
expelling the exhaust gases from the perforated pipe; at least a portion of the gases so expelled include a torsional component.

18. The insert device according to claim 14, wherein the perforated pipe comprises two bell-shaped ends at least partially sealed or fixed with welds to the existing exhaust system pipe.

* * * * *